(12) United States Patent
Mahar et al.

(10) Patent No.: US 11,661,339 B1
(45) Date of Patent: May 30, 2023

(54) HIGH PRESSURE GAS GENERATION SYSTEM FOR HYDROGEN PRODUCTION AND OTHER APPLICATIONS

(71) Applicant: General Atomics, San Diego, CA (US)

(72) Inventors: Scott Mahar, Poway, CA (US);
Matthew Fish, Vista, CA (US); Nelson Craig Stephens, San Diego, CA (US);
Dylan Schaubel, Encinitas, CA (US);
Bunsen Wong, La Jolla, CA (US);
Nathaniel LeCompte, Spring Valley, CA (US)

(73) Assignee: General Atomics, San Diego, CA (US)

( * ) Notice: Subject to any disclaimer, the term of this patent is extended or adjusted under 35 U.S.C. 154(b) by 218 days.

(21) Appl. No.: 17/135,787

(22) Filed: Dec. 28, 2020

(51) Int. Cl.
*C01B 3/08* (2006.01)
*H01M 8/065* (2016.01)
*C01B 3/06* (2006.01)
*B01J 3/03* (2006.01)
*B01J 3/02* (2006.01)
*H01M 8/04082* (2016.01)

(52) U.S. Cl.
CPC .............. *C01B 3/08* (2013.01); *B01J 3/02* (2013.01); *B01J 3/03* (2013.01); *C01B 3/061* (2013.01); *H01M 8/04201* (2013.01); *H01M 8/065* (2013.01)

(58) Field of Classification Search
CPC .... C01B 3/08; C01B 3/061; B01J 3/02; B01J 3/03; H01M 8/04201; H01M 8/065
See application file for complete search history.

(56) References Cited

U.S. PATENT DOCUMENTS

| | | | |
|---|---|---|---|
| 3,313,598 A | 4/1967 | Gluckstein et al. | |
| 3,985,866 A | 10/1976 | Oda et al. | |
| 5,052,272 A | 10/1991 | Lee | |
| 5,143,047 A * | 9/1992 | Lee | ........................... C01B 3/08 126/263.05 |
| 5,817,157 A | 10/1998 | Checketts | |
| 5,867,978 A | 2/1999 | Klanchar et al. | |
| 7,524,342 B2 | 4/2009 | Brinkley, III et al. | |
| 2020/0338372 A1* | 10/2020 | Sachidanadam | .... C01B 13/0211 |

* cited by examiner

*Primary Examiner* — Steven J Bos
*Assistant Examiner* — Syed T Iqbal

(57) ABSTRACT

Disclosed are apparatuses, systems, methods, and devices for generating high-pressure gas such as hydrogen and oxygen. In one aspect, an apparatus is disclosed. The apparatus includes a reactor which includes a pressure vessel containing a metal compound configured to react with a liquid to generate the high-pressure gas when the liquid is available in the vessel. The reactor includes an outlet configured to pass the generated high-pressure gas out of the vessel. The apparatus also includes a receiver configured to store the generated high-pressure gas generated in the vessel and passed to a receiver via the outlet or passed directly to fuel cell or vehicle tank.

18 Claims, 15 Drawing Sheets

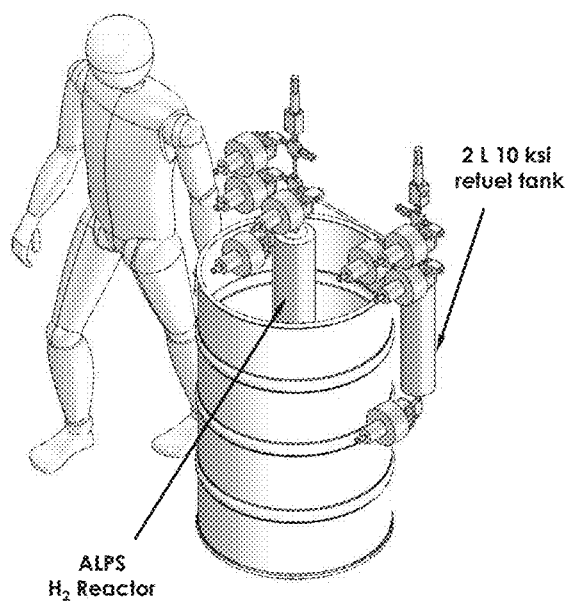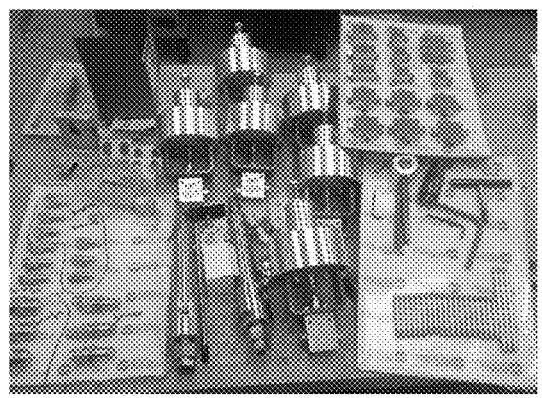
FIG. 2

Variables $\text{Fill\_tank}_L := 1L$ $\text{Reactor}_L := 3.3L$ $\text{Alloy}_{kg} := 500\text{gm}$ $\text{Al\_fract} := 90\%$ $< 280\ C \ldots 2Al + 6H_2O \rightarrow 2Al(OH)_3 + 3H_2$ $280 - 480\ C \ldots 2Al + 4H_2O \rightarrow 2AlO(OH) + 3H_2$ $> 480\ C \ldots 2Al + 3H_2O \rightarrow Al_2O_3 + 3H_2$

Calculations $$\text{Alloy}_L := \text{Alloy}_{kg} \cdot \frac{mL}{2.88\text{gm}} = 174\ mL$$

Assume fill to the top of the reactor with water:

$$H2O_{fill} := \text{Reactor}_L - \text{Alloy}_L = 3.126\ L$$

Calculate boehmite waste product:

$$\text{AlOOH}_{kg} := \text{Alloy}_{kg} \cdot \text{Al\_fract} \cdot \frac{mol}{27\text{gm}} \cdot \frac{mol}{mol} \cdot \frac{60\text{gm}}{mol} = 1\ kg$$

$$\text{AlOOH}_L := \text{AlOOH}_{kg} \cdot \frac{1mL}{3\text{gm}} = 0.333\ L \qquad \text{Acutal crystaline density}$$

$$\text{AlOOH}_{bulk\_L} := \text{AlOOH}_{kg} \cdot \frac{1mL}{0.5\text{gm}} = 2\ L \qquad \text{Bulk density (must be < Reactor vol)}$$

Calculate water used:

$$H2O_{used} := \text{Alloy}_{kg} \cdot \text{Al\_fract} \cdot \frac{mol}{27\text{gm}} \cdot \frac{4mol}{2mol} \cdot \frac{18\text{gm}}{mol} \cdot \frac{1mL}{\text{gm}} = 0.6\ L$$

Calculate hydrogen produced:

$$H2_{produced} := \text{Alloy}_{kg} \cdot \text{Al\_fract} \cdot \frac{mol}{27\text{gm}} \cdot \frac{3mol}{2mol} \cdot 2\frac{\text{gm}}{mol} = 50\ \text{gm}$$

Calculate end volume to fill:

$$H2_{reactor\_vol} := \lfloor \text{Reactor}_L - (H2O_{fill} - H2O_{used}) - \text{AlOOH}_L \rfloor = 440\ mL$$

$$H2\_fill_{vol} := \text{Fill\_tank}_L + H2_{reactor\_vol} = 1.44\ L$$

Calculate end pressure:

$$\text{Pres}_{gm\_L} := \frac{H2_{produced}}{H2\_fill_{vol}} = 34.7\ \frac{\text{gm}}{L}$$

$$\text{Pressure}_{est} := \frac{562\text{psi}}{\frac{\text{gm}}{L}} \cdot \left(\text{Pres}_{gm\_L} - 35\frac{\text{gm}}{L}\right) + 10000\text{psi} = 9840\ \text{psi}$$

FIG. 4

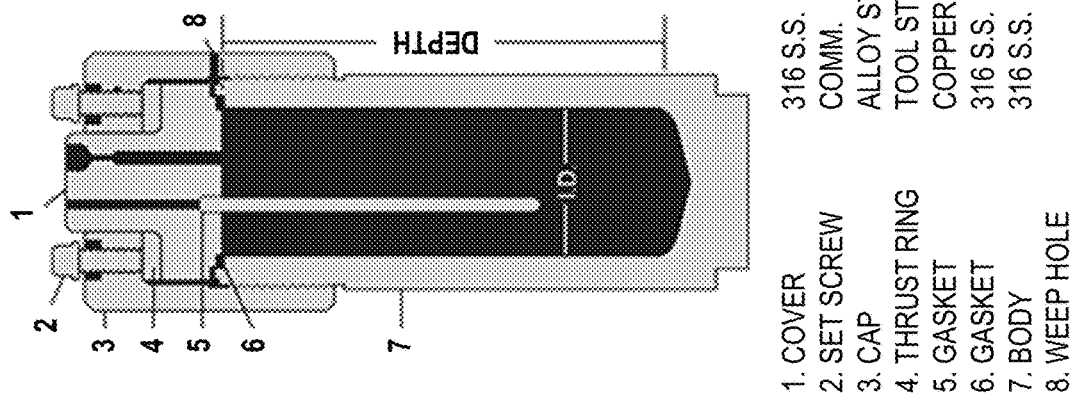

SERIES GC REACTORS

| Catalog No. | I.D. | O.D. | Inside Depth | Capacity | Material | Working Pressure (psi) 100°F | Working Pressure (psi) 650°F | Working Pressure (psi) 800°F |
|---|---|---|---|---|---|---|---|---|
| GC-1 | 1" | 2-1/2" | 10" | 125 mL | 316 S.S. | 13,800 | 12,500 | 12,000 |
| GC-3 | 1-1/2" | 2-1/2" | 10" | 280 mL | 316 S.S. | 7,750 | 7,000 | 6,900 |
| GC-5 | 1-1/2" | 4-3/8" | 10" | 280 mL | 316 S.S. | 16,000 | 14,500 | 14,000 |
| GC-7 | 1-1/2" | 4-3/8" | 21" | 600 mL | 316 S.S. | 16,000 | 14,500 | 14,000 |
| GC-9 | 2" | 4-3/8" | 10" | 500 mL | 316 S.S. | 12,500 | 11,400 | 11,000 |
| GC-11 | 2" | 4-3/8" | 21" | 1,040 mL | 316 S.S. | 12,500 | 11,400 | 11,000 |
| GC-13 | 2-1/2" | 4-3/8" | 10" | 800 mL | 316 S.S. | 9,200 | 8,400 | 8,200 |
| GC-15 | 2-1/2" | 4-3/8" | 21" | 1,160 mL | 316 S.S. | 9,200 | 8,400 | 8,200 |
| GC-17 | 3" | 6-7/8" | 10" | 1,150 mL | 316 S.S. | 13,000 | 11,000 | 10,000 |
| GC-19 | 3" | 6-7/8" | 21" | 2,430 mL | 316 S.S. | 13,000 | 11,000 | 10,000 |
| GC-21 | 3-1/2" | 6-7/8" | 10" | 1,575 mL | 316 S.S. | 10,500 | 9,000 | 8,000 |
| GC-23 | 3-1/2" | 6-7/8" | 21" | 3,300 mL | 316 S.S. | 10,500 | 9,000 | 8,000 |
| GC-25 | 4" | 6-7/8" | 10" | 2,060 mL | 316 S.S. | 8,500 | 7,300 | 6,500 |
| GC-27 | 4" | 6-7/8" | 21" | 4,325 mL | 316 S.S. | 8,500 | 7,300 | 6,500 |
| GC-29 | 4-1/2" | 6-7/8" | 10" | 2,600 mL | 316 S.S. | 6,500 | 5,500 | 5,000 |
| GC-31 | 4-1/2" | 6-7/8" | 21" | 5,475 mL | 316 S.S. | 6,500 | 5,500 | 5,000 |
| GC-33 | 5" | 6-7/8" | 10" | 3,200 mL | 316 S.S. | 5,000 | 4,300 | 4,000 |
| GC-35 | 5" | 6-7/8" | 21" | 6,750 mL | 316 S.S. | 5,000 | 4,300 | 4,000 |

FIG. 5B

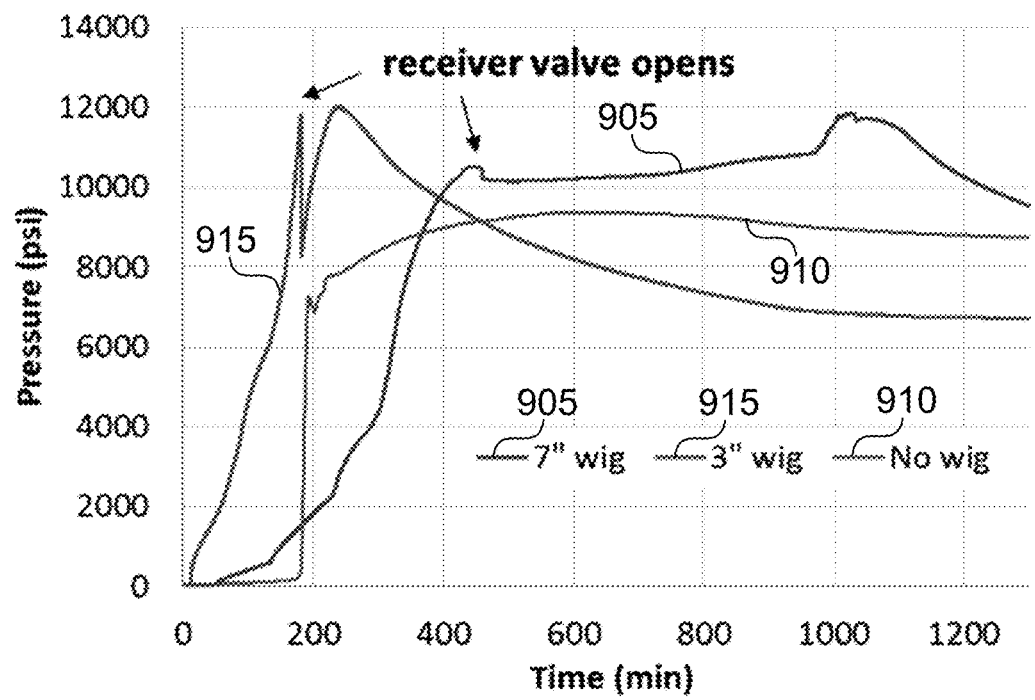
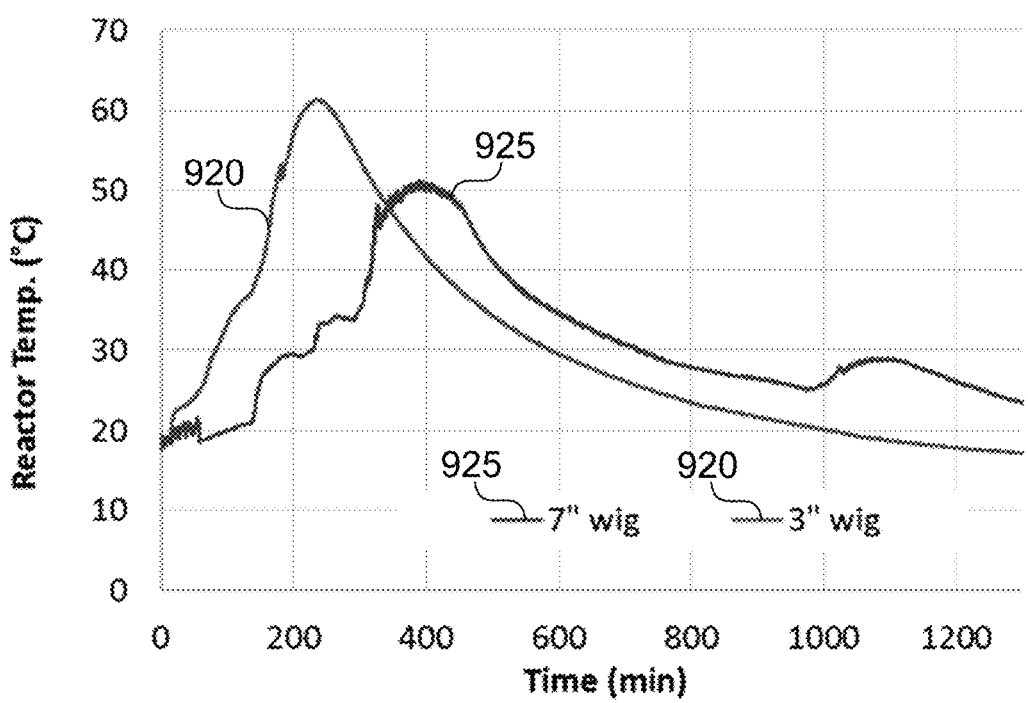
FIG. 9B

HIGH PRESSURE GAS GENERATION SYSTEM FOR HYDROGEN PRODUCTION AND OTHER APPLICATIONS

TECHNICAL FIELD

This patent document relates to the generation of high-pressure hydrogen gas and other gases for various applications.

BACKGROUND

Hydrogen gas can be generated via electrolysis or reformation of fossil fuels. Various implementations of electrolysis tend to use a great amount of energy and may be feasible in locations tied to the electrical grid with inexpensive sources of electricity. Reformation of methane, natural gas, or JP8 requires a complex system in which sulfur and other impurities must be removed before usable hydrogen can be generated. This aspect of these production systems adds complexity and cost to the production. In addition, various hydrogen gas production systems based on electrolysis and reformation require compression of the hydrogen for storage and this requirement can limit the applications of such production systems.

SUMMARY

This patent document discloses devices, systems, and methods for generating high-pressure gases, including, for example, high-pressure hydrogen and high-pressure oxygen.

In one aspect, an apparatus is disclosed. The apparatus includes a reactor which is a pressure vessel containing a metal compound configured to react with a liquid to generate the high-pressure gas when the liquid is available in the vessel. The reactor further includes an inlet configured to pass the liquid from outside the vessel to inside the vessel. The reactor includes an outlet configured to pass the generated high-pressure gas out of the vessel. The apparatus also can include a receiver configured to store the generated high-pressure gas generated in the vessel and passed to the receiver via the outlet.

In another aspect a method of generating a high-pressure gas is disclosed. The method incudes reacting a metal compound with a liquid in a reactor vessel to generate a gas. The method further includes pressurizing the gas into the high-pressure gas via the reaction without using a power source. The method also can include storing the high-pressure gas in a receiver vessel.

The following features can be included in various combinations. The metal compound comprises an alkali metal. The metal compound comprises an aluminum alloy and/or the liquid includes one or more of fresh water, ocean water, tap water, or other water-based liquid including urine. The aluminum alloy reacts with water according to one or more of the chemical reactions including: $2Al + 6H_2O \rightarrow 2AlO(OH)_3 + 3H_2$, $2Al + 4H_2O \rightarrow 2AlO(OH) + 3H_2$, or $2Al + 3H_2O \rightarrow Al_2O_3 + 3H_2$, and wherein the high-pressure gas is hydrogen. The chemical reaction is exothermic. High-pressure hydrogen is stored in the receiver at a pressure of 2000 to 10,000 pounds per square inch (psi) or more. The receiver is selected to have a maximum hydrogen storage capacity, and wherein the maximum storage capacity is selected to be a mass of hydrogen between 50 grams and 25 kilograms. The metal compound is potassium superoxide and the liquid is one or more of fresh water, ocean water, tap water, or other water-based liquid including urine. The potassium superoxide reacts with water according to the chemical reaction $4 KO_2 + 2 H_2O \rightarrow 4 KOH + 3 O_2$, and wherein the high-pressure gas is oxygen.

The above and other aspects and their implementations are described in greater detail in the drawings, the description and the claims.

BRIEF DESCRIPTION OF THE DRAWINGS

FIG. 2 depicts an example of a portable system, in accordance with some example embodiments.

FIG. 4 depicts various calculations for an exemplary system for high-pressure hydrogen gas generation, in accordance with some example embodiments.

FIG. 5B depicts some examples of reactors, in accordance with some example embodiments.

FIG. 9B depicts example plots of pressure and temperature vs. time for various wig lengths, in accordance with some example embodiments.

DETAILED DESCRIPTION

Figure 1:
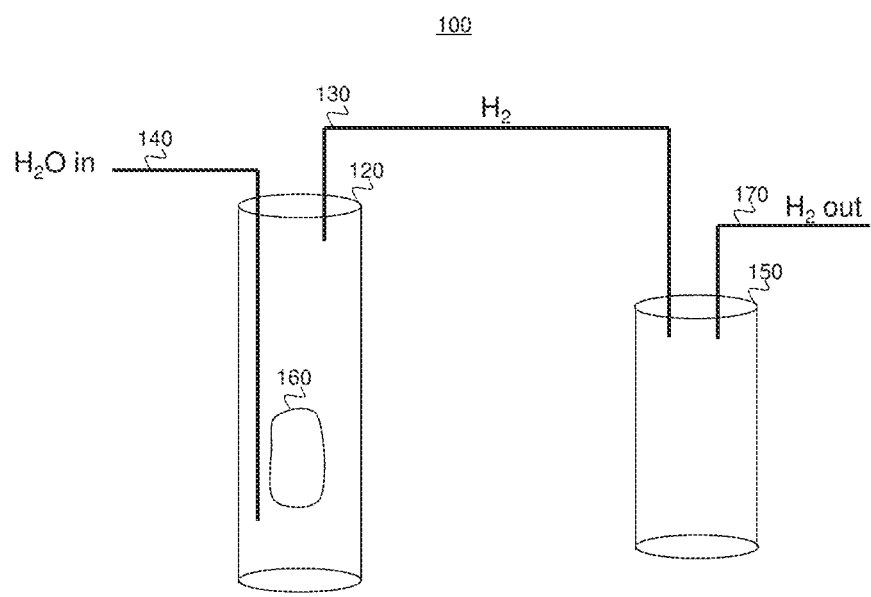
FIG. 1 depicts a schematic diagram of a hydrogen generation system, in accordance with some example embodiments.

The disclosed gas generation system, and in particular the hydrogen generation system uses an aluminum alloy to generate high-pressure hydrogen on demand (e.g., over 10,000 psi in some implementations). An aluminum alloy is exposed to water in a reactor vessel to generate hydrogen where the aluminum alloy includes metals that enable the reaction with water to produce hydrogen. In part because the boehmite byproduct is significantly larger in size than the initial alloy, system designs are provided to enable the generation of high-pressure hydrogen. A prototype system based on the disclosed technology has been constructed and tested for producing hydrogen gas at 14,000 psi. Instead of an aluminum alloy, any of the alkali metals could be used to react with water to make hydrogen. For example, alkali metals including lithium, sodium, potassium, rubidium, cesium, or francium could be used.

The disclosed technology can be implemented in ways that enable filling hydrogen tanks at a high-pressure without the use of compressors. Presently, hydrogen generated from other methods such as reformation of JP8 or electrolysis requires the hydrogen to be compressed leading to complex systems that require a significant amount of maintenance and power to perform the compression. The disclosed system in this patent document does not require a compressor or the associated power needed to run such a compressor. In some example embodiments, a small amount of power may be needed for a hotel load which could be powered by a fuel cell using extra hydrogen generated in the process.

The disclosed technology may be applied to various applications, including the filling of hydrogen tanks in fuel cell vehicles, or other fuel cell systems. The disclosed system can be used for other applications requiring high-pressure hydrogen (or oxygen) such as a compressed light gas gun or other explosives. Additional applications include the filling balloons with hydrogen such as weather balloons or high-altitude lighter than air systems.

One of the benefits of fuel cell technologies is to achieve higher energy densities than batteries. As fuel cells become more prevalent, the need for hydrogen to fuel these systems will increase. Shipping and storing hydrogen as a high-pressure gas or in a liquefied or cryogenic form is dangerous and are typically large systems. The disclosed subject matter reduces risk by shipping aluminum alloy and adding water to the reactor to generate high-pressure hydrogen on demand rather than transporting hydrogen gas. The disclosed system enables hydrogen to be generated on demand and eliminates the need to store or transport high-pressure or cryogenic hydrogen thereby eliminating the safety issues associated with high-pressure transport and cryogenic hydrogen.

The shipping and storage safety improvement of the disclosed system makes it very attractive for use at forward operating bases—mobile and stationary, as well as consumer markets including at gas stations, home use, and mobile environments. Mobile filling station systems, a larger fixed filling station, or a commercial gas station is estimated to be worth $5-$20 million each. Home units and/or mobile units would likely cost $10K. All of these deployments would also be a revenue stream in that the alloy would need to be continually supplied.

Hydrogen generation via electrolysis or reformation of fossil fuels faces certain technical limitations. The disclosed technology can be implemented to provide novel hydrogen production systems to address such technical limitations, e.g., producing ultra-high purity hydrogen gas (>99.99%) at high pressures without a compressor and without consuming large amounts of external energy. The small amount of energy for operating the disclosed system may be self-generated using excess hydrogen generated in the system.

The disclosed technology has been demonstrated to produce hydrogen at pressures up to 14,000 psi. Higher pressures may also be generated using a vessel suitable for higher pressures.

Disclosed are techniques, devices and systems for producing high-pressure gas without requiring a compressor to pressurize the gas. Generated gases include hydrogen ($H_2$) and oxygen ($O_2$).

Some example embodiments of a hydrogen generation system may be referred to as an aluminum power system (ALPS). In an ALPS, hydrogen gas is produced from a reaction of aluminum, or an aluminum alloy, with water according to:

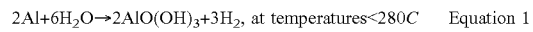
$2Al+6H_2O \rightarrow 2AlO(OH)_3+3H_2$, at temperatures<280C     Equation 1

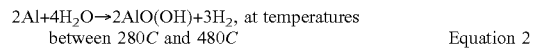
$2Al+4H_2O \rightarrow 2AlO(OH)+3H_2$, at temperatures between 280C and 480C     Equation 2

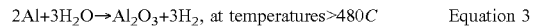
$2Al+3H_2O \rightarrow Al_2O_3+3H_2$, at temperatures>480C     Equation 3 where the reaction of aluminum and water produces gibbsite (also referred to as aluminum hydroxide) (e.g., $Al(OH)_3$), boehmite (also referred to as aluminum hydroxide oxide) (e.g., $AlO(OH)$), or aluminum oxide ($Al_2O_3$) and hydrogen gas. The reaction that occurs depends on temperature as shown in Equations 1-3. Aluminum and aluminum alloys are non-flammable and produce only non-toxic products making such a system safe during transportation before use, during use, and after use. In an example embodiment, 2 kilograms (kg) of hydrogen can be stored in a receiver vessel at 10,000 psi. Applications for use of the generated hydrogen are many including small, medium, and large fuel cell systems such as for fuel cell vehicles.

In some example embodiments oxygen may be generated according to:

$4KO_2+2H_2O \rightarrow 4KOH+3O_2$     Equation 4 where the reaction of potassium superoxide with water produces potassium hydroxide and oxygen gas.

FIG. 1 depicts a schematic diagram 100 of a hydrogen generation system, in accordance with some example embodiments. Reactor 120 is a gas tight and liquid tight vessel where the hydrogen generation reaction occurs, accepts an input liquid such as water at inlet 140 and outputs hydrogen at outlet 130. A passive cooling tank surrounding the walls of reactor 120 may be included in some embodiments. Inside reactor aluminum alloy 160 is held into position in the reactor 120. For example, a stand or other support device may be used to hold aluminum alloy 160 in position. Hydrogen gas exiting the reactor at outlet 130 may be passed to receiver tank 150 for storage, or otherwise used as it is generated. In some example embodiments, the stored hydrogen gas may reach a pressure in reactor 120 and stored in receiver 150 at a desired pressure. For example, hydrogen gas at 10,000 psi or even higher pressures over 100,000 psi may be generated. Pressurized hydrogen is available at receiver outlet 170 of the receiver 150.

The reaction, such as the reactions in EQs. 1-3 start once the aluminum in the aluminum alloy 160 comes in contact with water. The reaction is self-propagating as long as water is in contact with the aluminum alloy. The rate of hydrogen gas generation may be controlled by the form factor of the aluminum alloy 160 and the alloy composition and is not limited by the system pressure/receiver pressure.

In some example embodiments, the water is stored in the reactor in a bladder or other container that can be activated or pierced to initiate the reaction. For example, a bladder can be pierced by a sharp object to release the water, or a container can be pierced, or a pump activated to release the water. In some example embodiments, the reactor can made to incorporate a quick connect lid or opening, and the alloy can be dropped into a water-filler reactor. The reactor may then be closed off. In some example embodiments, plastic and/or salt coatings may be used to enable a delay in the reaction to provide time to close up the reactor. For example, a coated alloy may be placed into the water-filler reactor where the coating does not expose the alloy for a known amount of time giving tome to cover the reactor before the reaction starts.

In some example embodiments, the reactor is filled with water leaving a minimal head space (e.g., air gap between the top of the reactor and a top cover (not shown)). The minimal head space which enables the filling of the receive vessel to a high pressure such as 10,000 psi without byproduct (e.g., AlO(OH), 2AlO(OH)$_3$, 2Al$_2$O$_3$) growth filling and damaging the reactor prior to attaining the desired gas pressure.

The disclosed system may be used for applications where lower pressure hydrogen is needed, but no compressor is available. For example, the disclosed system may be used with vehicles that only need 50 grams of hydrogen at 5,000 psi or a lower pressure.

FIG. 2 depicts an example of a portable system, in accordance with some example embodiments. In the example of FIG. 2, the reactor may be installed inside a drum such as a 55-gallon drum. The reactor can be safely transported and even air-dropped to a location for use. The water in the drum may serve as a passive cooling system, or as an active cooling system by circulating the water in the drum through a cooling system. The water then enters the reactor and the reaction starts as described above. The reactor may be transported with the container such as a 55-gallon drum or may be transported separately and installed into any water holding container to begin hydrogen generation.

Figure 3:
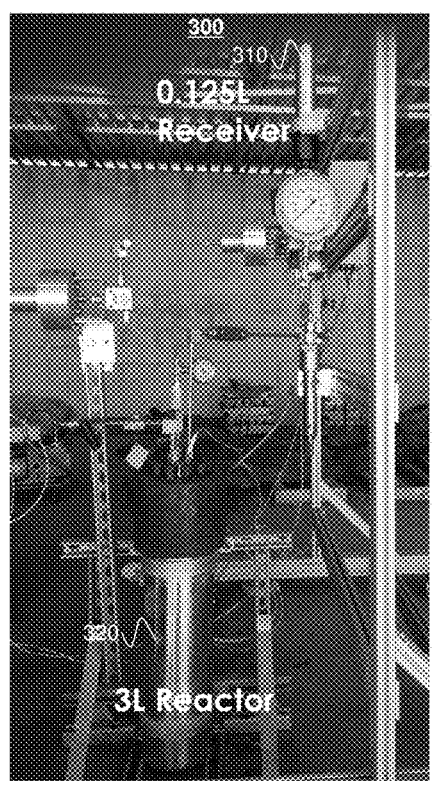
FIG. 3 depicts an example of a reactor and receiver system for high-pressure hydrogen gas generation and storage, in accordance with some example embodiments.

FIG. 3 depicts an example of a reactor and receiver for high-pressure hydrogen gas generation and storage using ALPS, in accordance with some example embodiments. In the example system shown in FIG. 3 a passive cooling system is not included but could be added as described above. Water enters the reactor 320 via a tube. Reactor 320 contains the aluminum alloy that reacts with the water producing hydrogen gas in accordance with EQ. 2. The hydrogen gas flows out of reactor 320 and passes through a tube to receiver 310 where the produced hydrogen gas is stored. In some example embodiments, reactor 320 may have a size of about 3 liters and receiver 310 may have a size of 0.125 liter which can hold 4 g of hydrogen gas at 10,000 psi. To start the generation of hydrogen, water is pumped into the reactor at ambient pressure. No external heat or power source is needed to start the hydrogen generation.

FIG. 4 depicts examples of various calculations for an exemplary system for high-pressure hydrogen gas generation. In this example, a receiver fill tank has volume of 1 liter (L), the reactor has a volume of 3.3 L, the amount of alloy is 500 grams (gm), and the fraction of aluminum in the alloy is 90%. The calculations show the volume of alloy, the volume of water in the reactor, the amount of boehmite waste, the volume of water used, the mass of hydrogen produced, the reactor volume filled with hydrogen, the total volume filled with hydrogen, and the estimated pressure.

Figure 5A:
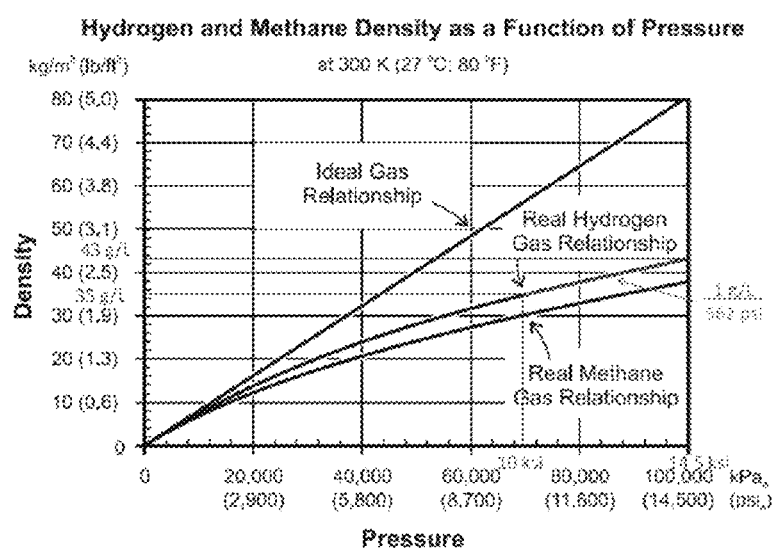
FIG. 5A shows the density of hydrogen as a function of pressure.

FIG. 5A is a diagram showing an example of the density of hydrogen as a function of pressure in a system based on the disclosed technology. At 10,000 psi the density of hydrogen is 35 gm/L and at 14,500 psi the density of hydrogen is 43 gm/L. Estimating the relationship of density to pressure as a linear relationship between 10 kpsi and 14.5 kpsi, the slope is (1 gm/L)/562 psi. This can be used in the calculation of estimated pressure as 9840 psi for the parameter used in FIG. 4.

FIG. 5B depicts some examples of reactors. The reactors shown are available from High Pressure Equipment Company. Many other reactors may also be suitable.

Figure 6A:
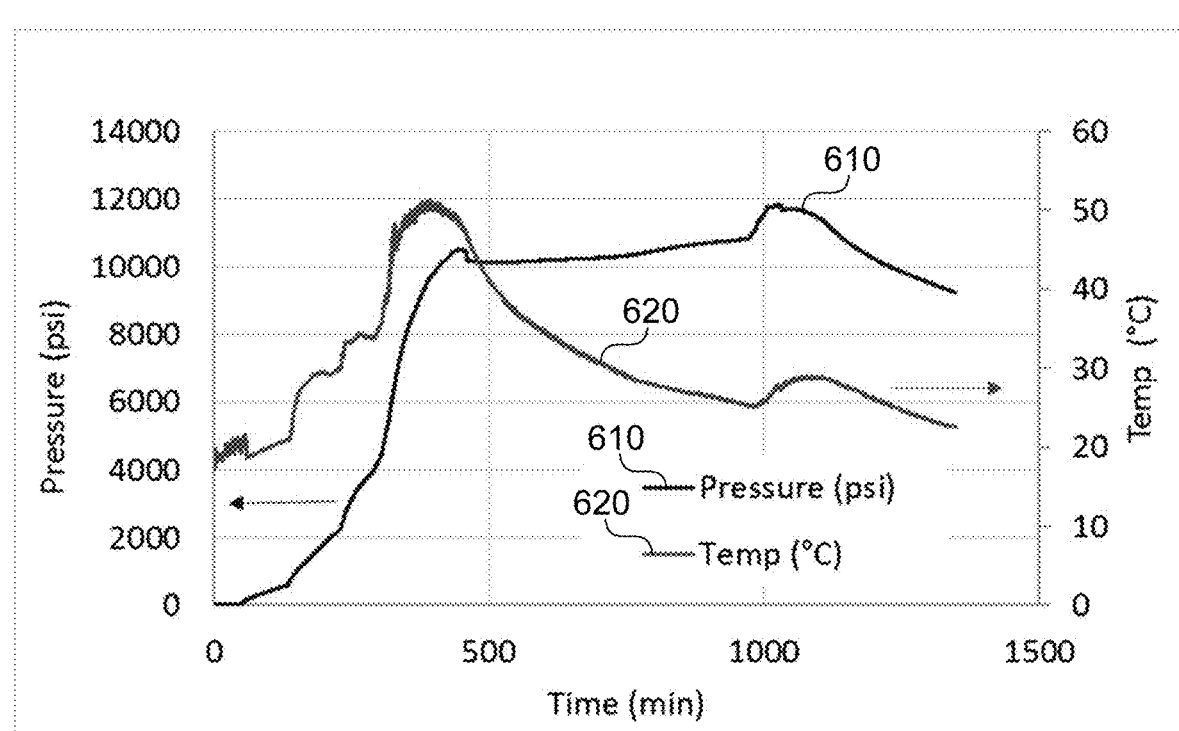
FIG. 6A depicts example data of hydrogen gas pressure and temperature as a function of time after starting the generation of hydrogen up to 12,000 psi.

FIG. 6A depicts example data 600 of hydrogen gas pressure 610 and temperature 620 as a function of time after starting the generation of hydrogen from a test system based on the disclosed technology. As shown in this example data, between the start time (time=0) and about 500 minutes, the pressure increases from 0 psi to about 10 kpsi and the temperature increases from about 22C to about 52C. At 1000 minutes, the pressure has increased to about 12 kpsi and the temperature has decreased to about 36C, and the pressure is slowly bled down.

Figure 6B:
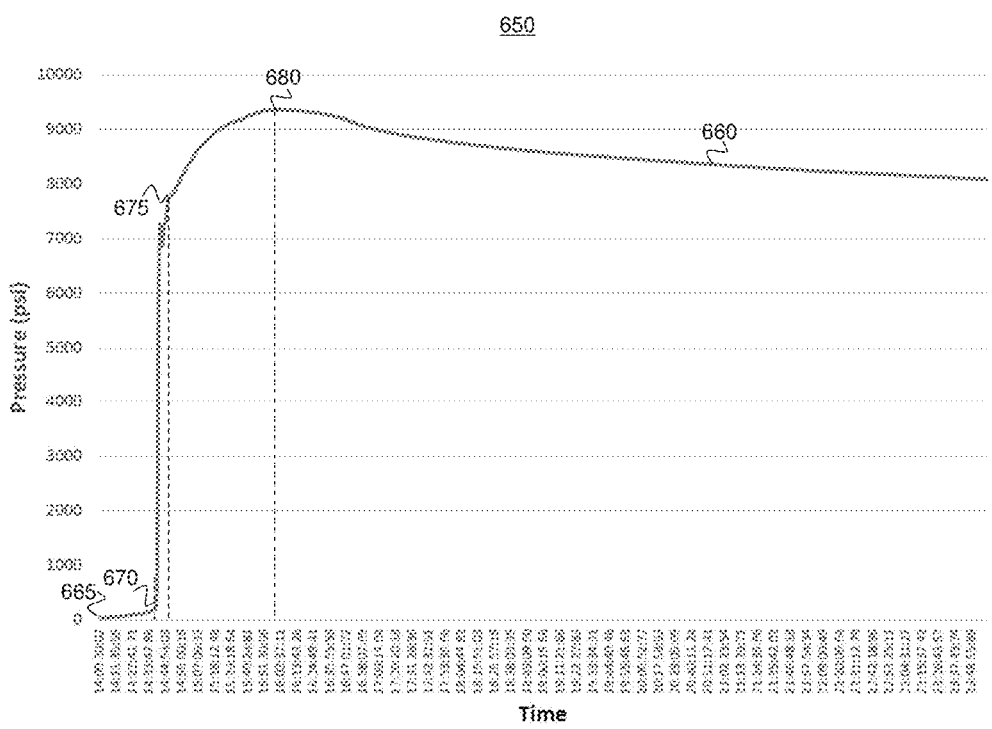
FIG. 6B depicts example data of hydrogen gas pressure as a function of time after starting the generation of hydrogen for another experiment.

FIG. 6B depicts another example plot 650 of hydrogen gas pressure 660 as a function of time after starting the generation of hydrogen for another example system based on the disclosed technology. Between the start time (time=14:00) and about 14:35 (35 minutes after start), the pressure increases from 0 psi to about 100 psi. Between about 14:35 and about 14:50 (50 minutes after start) the pressure increases to about 7800 psi. Between about 14:50 and about 15:55 (115 minutes after start) the pressure increases to about 9400 psi.

Figure 7A:
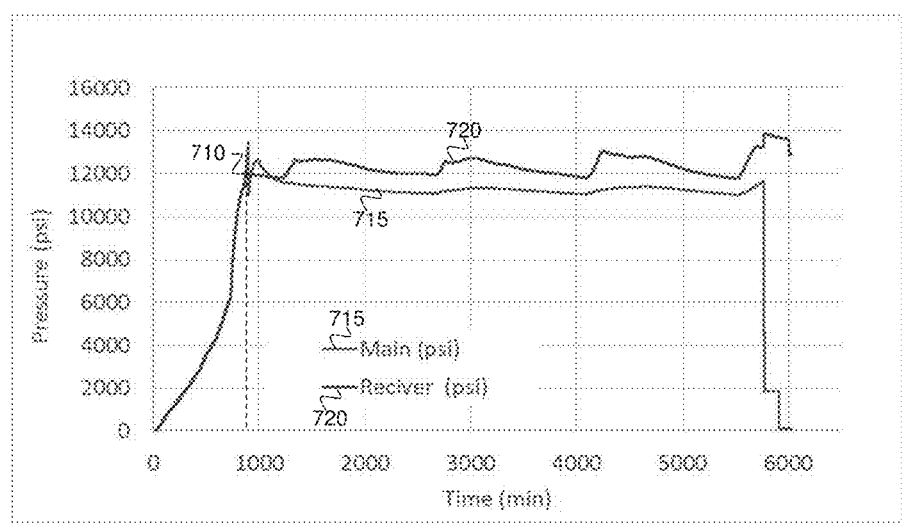
FIG. 7A depicts data of hydrogen gas pressure at the reactor and at the receiver as a function of time.
Figure 7B:
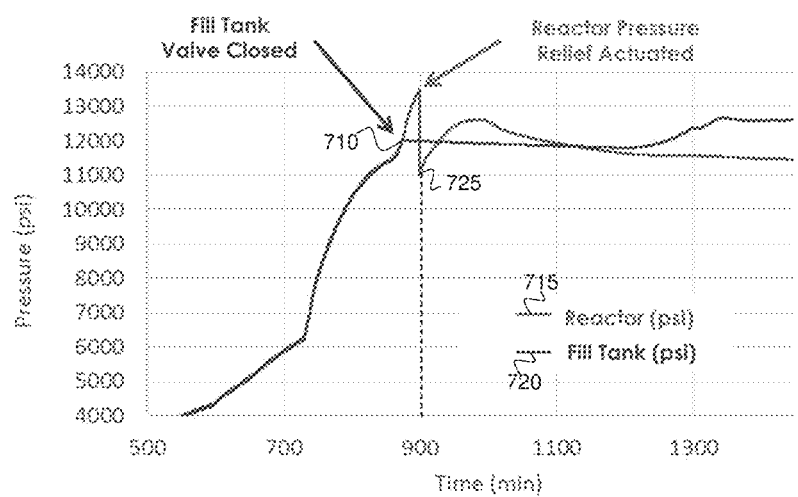
FIG. 7B shows an expanded view of FIG. 7A.

FIG. 7A depicts example data showing hydrogen gas pressure at the reactor and at the receiver as a function of time. Between the start time (time=0) and about 875 minutes at 710, the pressure 715 in the reactor and the pressure 720 in the receiver increase from 0 psi to about 12 kpsi. Pressures 715 and 720 track one another because the reactor and receiver are connected so that hydrogen may flow freely between the two. FIG. 7B shows an expanded view around the time of 875 minutes after the reactor start time. At 710, a valve between the receiver and the reactor is closed and because the reactor continues to produce hydrogen, the pressure 715 continues to increase in the reactor. At 725, when the reactor reaches a threshold pressure that causes a relief valve to open, hydrogen is released thereby reducing the pressure in the reactor. As shown, the relieve valve operation may include some hysteresis causing the relief valve to remain open to a pressure lower than the threshold pressure that caused it to open. In the example of FIGS. 7A and 7B, after 725 the pressure does not rise again enough to cause the pressure relief valve to open again. Fluctuation of the receiver tank pressure after about 1300 minutes is due to daily temperature changes in the environment where the receiver is stored.

Figure 8:
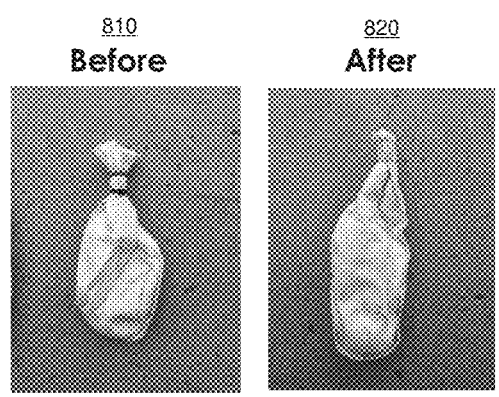
FIG. 8 depicts example images of a bag holding aluminum alloy before hydrogen generation and holding leftover alloy and the boehmite waste product after hydrogen generation, in accordance with some example embodiments.

FIG. 8 depicts example images of a bag holding the metal alloy before hydrogen generation and holding leftover alloy and the boehmite waste product after hydrogen generation. Fine boehmite with a size around 2-50 microns which is allowed to accumulate in the water reacting with the metal alloy can cause the clogging of valves. In order to prevent clogging, the metal alloy can be placed in a filter bag that allows water and hydrogen to pass through the bag but prevents particles 1 micron or larger from passing through the filter bag. This causes the fine boehmite to remain in the filter bag and prevent the boehmite particles from clogging the system valves or other components. Shown at 810 is a picture of a 1 micron filter bag before being used to generate hydrogen in a reactor and after use at 820. The bag appears to be more full of material after use due to the growth of the boehmite waste product compared to the initial volume of the alloy.

Figure 9A:
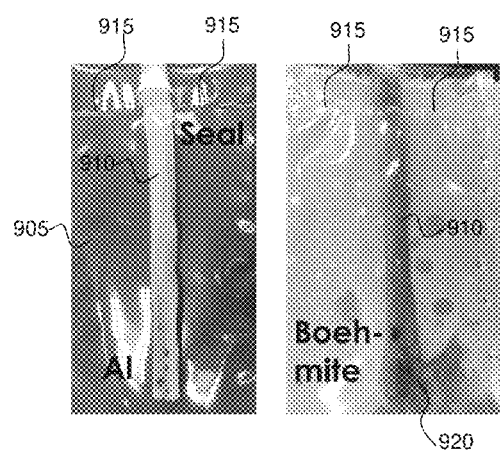
FIG. 9A depicts an example where aluminum alloy is vacuum sealed inside plastic with a wig extending out of the mostly sealed bag, in accordance with some example embodiments.

In some systems, a fast reaction and pressure build up slows the pumping of water into the reactor. As a result, venting during pumping may be needed which may result in a loss of hydrogen. Slowing the reaction by employing osmosis may help prevent the loss of hydrogen by delaying the hydrogen generation reaction. FIG. 9A depicts an example where aluminum alloy is vacuum sealed inside plastic 905 with wig 910 extending out of the mostly sealed bag. Seals 915 surround the wig at one end of the bag. The boehmite waste product 920 is mostly or completely confined to the bag. Once the bag is submerged, the wig wets and brings water in contact with the aluminum alloy. The osmosis is controlled by the geometry of the wig. Using the sealed bag and wig, the reaction start may be delayed, or the reaction rate may be reduced. For example, the reaction start may be delayed by 90 minutes.

FIG. 9B depicts example plots of pressure and temperature vs. time for various wig lengths. FIG. 9B at 900A depicts pressure as a function of time for 7-inch wig at 905, a 3-inch wig at 915 and no wig at 910 for an example hydrogen generation system. The pressure rises more quickly in the system with no wig. In other words, the slope of the pressure increase with no wig shown at 910 is greater than the slope for the 7-inch wig at 905 and the 3-inch wig at 915. The system with the 7-inch wig produces hydrogen more slowly than both the system with the 3-inch wig and the system with no wig. FIG. 9B at 900B depicts temperature as a function of time for 7-inch wig at 925 and a 3-inch wig at 920 for example hydrogen generation system. The temperature profiles as a function of time for the 7-inch wig system is broader and has a lower maximum temperature compared to the 3-inch wig. As such, the temperature rise is tempered by the longer wig.

Figure 10:
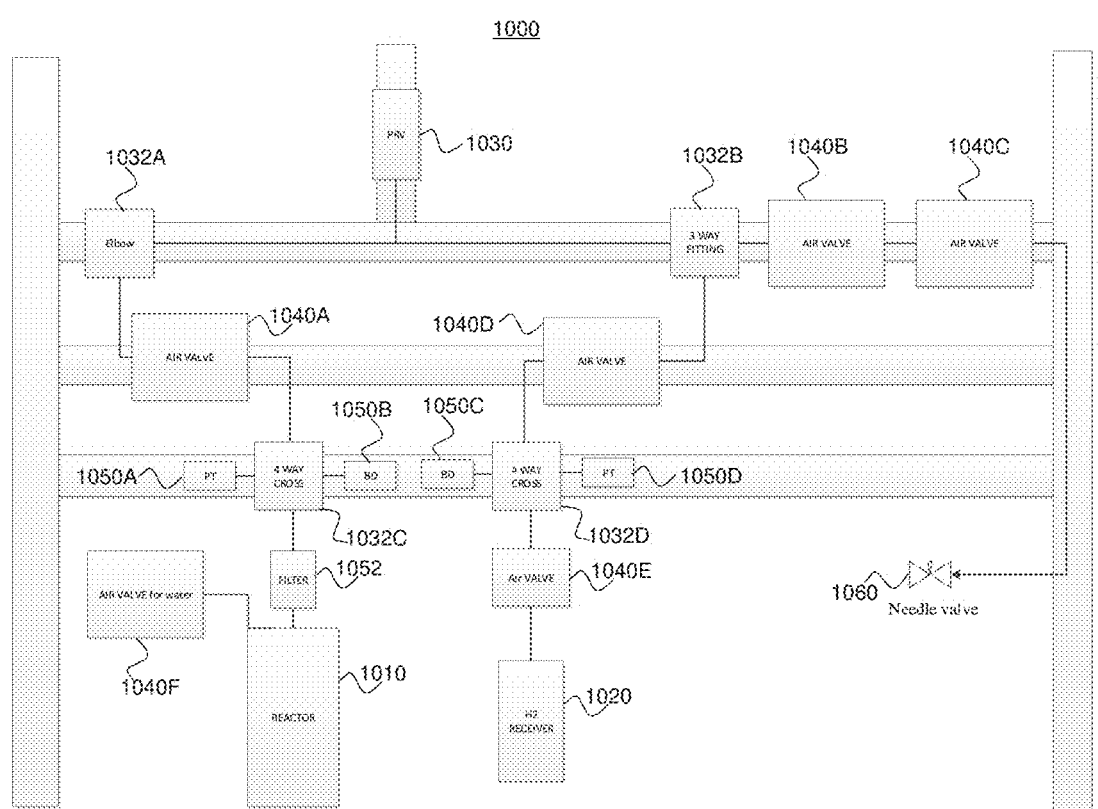
FIG. 10 depicts an example layout of a hydrogen generation system, in accordance with some example embodiments.

FIG. 10 depicts an example layout 1000 of a hydrogen generation system based on an implementation of the disclosed technology. The example layout includes reactor 1010 for generating hydrogen and receiver tank 1020 for receiving and storing the hydrogen in a pressurized vessel. The system includes various air actuated valves 1040A-F, fittings/elbow/cross 1032A-1032D, pressure relief valve 1030, filter 1052, pressure and temperature sensors 1050A-D, and needle valve 1060.

Figure 11:
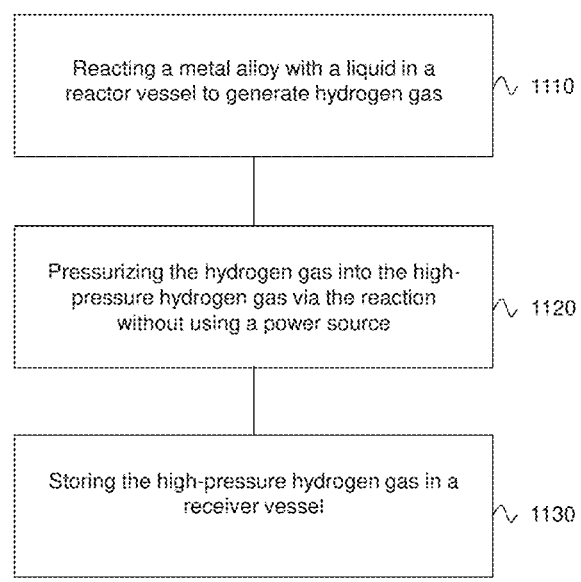
FIG. 11 depicts a method for generating high-pressure hydrogen gas, in accordance with some example embodiments.

FIG. 11 depicts a method 1100 for generating high-pressure hydrogen gas. At 1110, the method includes reacting a metal alloy with a liquid in a reactor vessel to generate hydrogen gas. At 1120, the method includes pressurizing the hydrogen gas into the high-pressure hydrogen gas via the reaction without using a power source. At 1130, the method includes storing the high-pressure hydrogen gas in a receiver vessel.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various components in the embodiments described in this patent document should not be understood as requiring such separation in all embodiments.

Only a few implementations and examples are described, and other implementations enhancements and variations can be made based on what is described and illustrated in this patent document.

What is claimed is:

1. An apparatus for generating a pressurized gas, comprising:
   a reactor comprising:
      a pressure vessel containing a metal compound configured to react with a liquid via contact between the metal compound and the liquid without applying external heat or power to generate a pressurized gas at a pressure greater than or equal to 2000 pounds per square inch, when the liquid is available in the pressure vessel to be in contact with the metal compound to cause a reaction between the metal compound and the liquid;
      an inlet configured to pass the liquid from outside the pressure vessel to inside the pressure vessel; and
      an outlet configured to pass the generated pressurized gas out of the pressure vessel while regulating a liquid level in the pressure vessel via the pressure of the generated pressurized gas inside the pressure vessel to control the reaction between the metal compound and the liquid; and
   a receiver coupled to the outlet to receive the generated pressurized gas from the pressure vessel and configured to store the generated pressurized gas.

2. The apparatus of claim 1, wherein the metal compound comprises an alkali metal.

3. The apparatus of claim 1, wherein the metal compound comprises an aluminum alloy.

4. The apparatus of claim 1, wherein the liquid includes one or more of fresh water, ocean water, tap water, or other water-based liquid including urine.

5. The apparatus of claim 3, wherein the aluminum alloy reacts with water according to one or more chemical reactions including:

$$2Al+6H_2O \rightarrow 2AlO(OH)_3+3H_2,$$

$$2Al+4H_2O \rightarrow 2AlO(OH)+3H_2,$$

$$2Al+3H_2O \rightarrow Al_2O_3+3H_2,$$

and wherein the generated pressurized gas comprises hydrogen.

6. The apparatus of claim 1, wherein the generated pressurized gas comprises hydrogen and is stored in the receiver at a pressure of 3000 pounds per square inch (psi) or more.

7. The apparatus of claim 1, wherein the receiver is selected to have a maximum storage capacity for storing hydrogen as the generated pressured gas, and wherein the maximum storage capacity is selected to be a mass of hydrogen between 50 grams and 25 kilograms.

8. The apparatus of claim 1, wherein the metal compound comprises a potassium superoxide that reacts with water according to $4 KO_2+2 H_2O \rightarrow 4 KOH+3 O_2$, and wherein the generated pressurized gas comprises oxygen.

9. The apparatus of claim 1, wherein the metal compound is further configured to include a coating comprising plastic or salt to delay the reaction after exposure to the liquid.

10. A method of generating a pressurized gas, comprising:
   placing a metal compound to be in contact with a liquid in a reactor vessel to cause, without applying external heat or power, a reaction between the metal compound and the liquid to generate a gas; and
   pressurizing the gas to a pressure greater than or equal to 2000 pounds per square inch, via the reaction without using a power source, to regulate a level of contact between the metal compound and the liquid to control the reaction between metal compound and the liquid.

11. The method of claim 10, wherein the metal compound comprises an alkali metal.

12. The method of claim 10, wherein the metal compound comprises an aluminum alloy.

13. The method of claim 10, wherein the liquid is one or more of fresh water, ocean water, tap water, or other water-based liquid including urine.

14. The method of claim 12, wherein the aluminum alloy reacts with water according to one or more chemical reactions including:

$$2Al+6H_2O \rightarrow 2AlO(OH)_3+3H_2,$$

$$2Al+4H_2O \rightarrow 2AlO(OH)+3H_2,$$

$$2Al+3H_2O \rightarrow Al_2O_3+3H_2,$$

and wherein the generated pressurized gas comprises hydrogen.

15. The method of claim 14, comprising storing the pressurized hydrogen in a receiver tank at a pressure of 2,000 pounds per square inch (psi) or more.

16. The method of claim 10, wherein the metal compound includes potassium superoxide and the liquid includes one or more of fresh water, ocean water, tap water, or other water-based liquid including urine.

17. The method of claim 10, wherein the metal compound comprises a potassium superoxide that reacts with water according to 4 $KO_2$+2 $H_2O \rightarrow$ 4 KOH+3 $O_2$, and the pressurized gas comprises oxygen.

18. The method of claim 10, wherein the metal compound is configured to include a coating comprising plastic or salt to delay the reaction after exposure to the liquid.

* * * * *